(12) United States Patent
Neisen

(10) Patent No.: US 10,407,846 B2
(45) Date of Patent: Sep. 10, 2019

(54) COMBINATION DOOR/PLATFORM FOR MAINTENANCE ACCESS FOR CONVEYOR OF MATERIAL TRANSFER VEHICLE

(71) Applicant: Roadtec, Inc., Chattanooga, TN (US)

(72) Inventor: Matthew Neisen, Soddy Daisy, TN (US)

(73) Assignee: Roadtec, Inc., Chattanooga, TN (US)

( * ) Notice: Subject to any disclaimer, the term of this patent is extended or adjusted under 35 U.S.C. 154(b) by 0 days.

(21) Appl. No.: 16/048,866

(22) Filed: Jul. 30, 2018

(65) Prior Publication Data

US 2019/0078273 A1 Mar. 14, 2019

Related U.S. Application Data

(60) Provisional application No. 62/556,576, filed on Sep. 11, 2017.

(51) Int. Cl.
*E01C 23/00* (2006.01)
*B65G 41/00* (2006.01)
*B65G 47/20* (2006.01)

(52) U.S. Cl.
CPC ............ *E01C 23/00* (2013.01); *B65G 41/008* (2013.01); *B65G 47/20* (2013.01); *E01C 2301/04* (2013.01)

(58) Field of Classification Search
CPC ....... B65G 41/008; B65G 47/20; E01C 19/02; E01C 23/00
USPC .............................................. 404/81, 83, 85
See application file for complete search history.

(56) References Cited

U.S. PATENT DOCUMENTS

| 3,216,337 | A | 11/1965 | MacDonald |
| 3,776,326 | A | 12/1973 | Davin et al. |
| 4,200,408 | A | 4/1980 | Babler et al. |
| 2014/0041964 | A1 | 2/2014 | Bedyk |

OTHER PUBLICATIONS

International Search Report and Written Opinion of counterpart PCT Application No. PCT/US2018/044332 dated Oct. 16, 2018.

*Primary Examiner* — Gene O Crawford
*Assistant Examiner* — Lester Rushin, III
(74) *Attorney, Agent, or Firm* — Chambliss, Bahner & Stophel, P.C.

(57) ABSTRACT

A material transfer vehicle includes a material receiving device that is adapted to receive asphalt paving material, and a receiving conveyor that is operatively attached to the material receiving device. The receiving conveyor is driven by a chain drive assembly and includes a chain tension adjustment assembly. The receiving conveyor is pivotable about a substantially horizontal axis so that it can be moved between a transport configuration in which the material receiving device is raised, an intermediate adjustment configuration, and a working configuration in which the material receiving device is lowered. A housing structure encloses protected components and includes an opening adjacent to the protected components. A combination door and platform is attached to the housing structure and is adapted to be moved between a closed configuration that covers the opening and an open configuration that provides access to the protected components, and also provides a platform on which an operator can stand to access the chain tension adjustment assembly.

10 Claims, 6 Drawing Sheets

COMBINATION DOOR/PLATFORM FOR MAINTENANCE ACCESS FOR CONVEYOR OF MATERIAL TRANSFER VEHICLE

CROSS-REFERENCE TO RELATED APPLICATION

This application claims the benefit of U.S. Provisional Patent Application No. 62/556,576 which was filed on Sep. 11, 2017.

FIELD OF THE INVENTION

This invention relates generally to a material transfer vehicle that is adapted for transferring asphalt paving material from an asphalt supply truck or windrow to an asphalt paving machine. More particularly, the invention relates to a material transfer vehicle having a combination door and platform to provide access to multiple components of the receiving conveyor of the material transfer vehicle.

BACKGROUND OF THE INVENTION

The traditional process for paving roadways with asphalt paving material is generally carried out by an asphalt paving machine and a number of supply trucks which transport the asphalt paving material from an asphalt production plant to the paving machine. The paving machine generally is self-propelled and is driven by a wheeled or tracked drive system. A hopper is located at the front end of the machine to receive asphalt paving material from a dump-type supply truck, and a floating screed is located at the rear end of the machine to form the asphalt mat. A conveyor delivers the asphalt paving material from the hopper to a transversely oriented distributing auger just ahead of the screed that discharges the asphalt paving material across the roadway in front of the screed.

Sometimes, asphalt paving material is discharged directly from a delivery truck into the hopper of the asphalt paving machine. A typical asphalt paving machine has a hopper with a capacity of 5-15 tons, whereas a typical dump-type delivery truck has a capacity of about 20 tons. The front of the paving machine is usually provided with rollers which are adapted to engage the rear tires of a delivery truck. This arrangement enables asphalt paving material to be transferred from the truck to the asphalt paving machine by positioning the delivery truck in front of the paving machine and raising the dump bed of the truck to allow the asphalt paving material to slide down the bed into the hopper of the paving machine as the paving machine pushes the truck along in front of it. However, because the delivery truck usually carries more asphalt paving material than the hopper can receive at one time, it may be necessary for the paving machine to push the delivery truck along for several minutes while its conveyor transports the asphalt paving material out of the hopper to the distributing auger in front of the screed. This may be difficult to manage when the paving machine is proceeding through intersections or operating on curved sections of the roadway.

Furthermore, when the truck bed of the delivery truck is raised, it should not come into contact with the hopper of the paving machine, and it should not be carried by or ride on any portion of the paving machine. For smaller-capacity dump trucks, contact with the hopper of the asphalt paving machine is not often a problem. However, such contact can be a problem when large tractor-semitrailer units are used as delivery vehicles, particularly when the truck bed is extended to its highest point. In addition, if a delivery truck contacts the asphalt paving machine so that a portion of the weight of the delivery truck is carried by the paving machine as the paving operation is carried out, the screed elevation may be changed, which will affect the elevation of the finished asphalt mat.

When asphalt paving material is delivered directly to a paving machine by delivery trucks, it is frequently necessary for a series of delivery trucks to move into contact with the front end of the paving machine to serially discharge their loads into the paving machine's hopper. This method of delivery requires multiple truck maneuvers that are often difficult to carry out without stopping the paving machine. However, when a paving machine stops and subsequently restarts, its floating screed will produce a dip in the asphalt mat (when the machine stops) and a bump (when it restarts). Furthermore, the ability of the paving machine operator to place a smooth mat on the roadway will be affected by the rate of feed of asphalt paving material to the paving machine. This requires planning for proper scheduling of delivery trucks and coordination with the asphalt production facility. However, delays at the production facility or traffic encountered by the delivery trucks can thwart the efforts of the most careful planners. Consequently, because it is desirable to keep the paving machine moving at all times during an asphalt paving operation, and since delivery trucks must be unloaded as they are pushed along in the paving direction, it is frequently necessary to have delivery trucks queue up near the paving machine to ensure that a loaded truck is available to move quickly into unloading position as an unloaded truck is moved out of the way. This may result in heat losses in the asphalt paving material in the waiting trucks, which can affect the quality of the asphalt mat being created by the paving machine.

Because of the difficulties associated with the timely delivery of asphalt paving material by individual delivery trucks directly to a paving machine, material transfer vehicles have been used in recent years to transport asphalt paving material to asphalt paving machines engaged in paving operations. One type of material transfer vehicle may be used to shuttle asphalt paving material between the delivery trucks and an asphalt paving machine. Such a self-propelled material transfer vehicle typically includes a material-receiving device comprising a large-capacity truck-receiving hopper or a windrow pick-up head, and an inclined receiving conveyor extending upwardly from the material-receiving device. Asphalt paving material carried by the receiving conveyor from the truck-receiving hopper or windrow pick-up head is discharged off the elevated output end of the receiving conveyor into a chute mounted on the lower end of a discharge conveyor, or into an intermediate surge hopper that is sized to hold the entire load of a delivery truck. The discharge of asphalt paving material off the elevated output end of the receiving conveyor so that it may fall under the influence of gravity into a chute or surge hopper assists in preventing undesirable segregation of the various particulate components of the asphalt paving material by particle size.

Material transfer vehicles of the type that are equipped with a surge hopper typically include a surge hopper unloading conveyor in the surge hopper that is adapted to transfer the asphalt paving material to the discharge conveyor. Discharge conveyors mounted on material transfer vehicles with and without surge hoppers are generally pivotable about a substantially vertical axis so that the material transfer vehicle can be positioned alongside or in front of an asphalt paving machine that is laying an asphalt mat and rapidly discharge asphalt paving material into the hopper of the paving machine as the material transfer vehicle moves with the paving machine along the roadway. Because of its rapid loading and unloading capabilities, a self-propelled material transfer vehicle can rapidly shuttle between delivery trucks at a pick-up point and an asphalt paving machine that is laying an asphalt mat at a paving site so that there is less likelihood that the paving machine will have to stop paving because of a lack of asphalt paving material.

The receiving conveyor of a material transfer vehicle is typically a chain-driven drag conveyor. Such a conveyor starts and stops frequently during operation, and it carries a load that may be quite heavy at times. Consequently, it is necessary to adjust the tension of the drive chain on both sides of the conveyor from time to time. The chain tension is adjusted by manually using a wrench to adjust a bolt in a chain tension adjustment assembly that is located on opposite sides at the elevated output end of the receiving conveyor. Consequently, an operator of a material transfer vehicle having a surge hopper either has to climb into the surge hopper to gain access to the chain tension adjustment assembly, or he must use an external ladder or lift truck to gain the necessary access.

It would be desirable if a platform for access to the chain tension adjustment assembly of the receiving conveyor of a material transfer vehicle could be provided which is integrally incorporated into the housing structure of the material transfer vehicle. It would also be desirable if such a platform could also serve as a door for a recess in the structure of the material transfer vehicle that provides access to protected components (as hereinafter defined). It would also be desirable if a preferred embodiment of the platform could serve as a door for a recess in the structure of the material transfer vehicle that accommodates storage of the wrench or other tool that is used to adjust the chain tension.

Advantages of the Invention

Among the advantages of a preferred embodiment of the invention is that it provides a platform for access to the chain tension adjustment assembly of the receiving conveyor of a material transfer vehicle which is integrally incorporated into the housing structure of the material transfer vehicle. Another advantage of a preferred embodiment of the invention is that it provides such a platform that also serves as a door for a recess in the housing structure of the material transfer vehicle that provides access to protected components (as hereinafter defined). Still another advantage of a preferred embodiment of the invention is that it provides such a platform that also serves as a door for a recess in the structure of the material transfer vehicle that accommodates storage of the wrench or other tool that is used to adjust the chain tension. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity.

Several terms are specifically defined herein. These terms are to be given their broadest reasonable construction consistent with such definitions, as follows:

The term "asphalt paving material" refers to a bituminous paving mixture that is comprised of asphalt binder and crushed stone and/or other aggregate materials of varying particle size, and which is used for paving purposes.

The terms "asphalt paving machine", "paving machine" and "paver" refer to a finishing machine for applying asphalt paving material to form an asphalt mat on a roadway, parking lot or similar surface. An asphalt paving machine or paver is typically a self-propelled vehicle having a hopper at one end for receiving asphalt paving material and a floating screed at the other end for forming an asphalt mat.

The term "asphalt mat" refers to a layer of asphalt paving material such as is applied by an asphalt paving machine to produce a roadway, parking lot or similar surface.

The term "material transfer vehicle" refers to a vehicle that is adapted to receive asphalt paving material directly from a supply truck or from a windrow and to transfer the asphalt paving material to the hopper of an asphalt paving machine at a paving site. A material transfer vehicle includes a receiving conveyor that is adapted to receive asphalt paving material from a material-receiving device, such as a truck-receiving hopper or a windrow pick-up head, and to convey asphalt paving material for discharge into a surge hopper or onto a discharge conveyor.

The term "substantially horizontal" and similar terms, when used with respect to a material transfer vehicle or a component of a material transfer vehicle, refer to a direction or orientation that is substantially parallel to the surface on which the material transfer vehicle is placed for operation.

The terms "bottom", "below" and similar terms, when used with respect to a material transfer vehicle or a component of a material transfer vehicle, refer to a location or direction that is nearer the surface on which the material transfer vehicle is placed for operation.

The terms "top", "above" and similar terms, when used with respect to a material transfer vehicle or a component of a material transfer vehicle, refer to a location or direction that is farther from the surface on which the material transfer vehicle is placed for operation.

The term "protected component" refers to a component of a material transfer vehicle that needs to be protected from exposure to the exterior environment, but also needs to be accessible for inspection, maintenance and/or repair. Such protected components include (but are not limited to) cables, electrical wiring, communication lines, hydraulic fluid lines and other components of a hydraulic circuit, and which are located adjacent to a portion of a housing structure of the material transfer vehicle. Some such protected components, such as certain hydraulic fluid lines, may be located adjacent to the surge hopper that is defined in part by a housing structure that encloses the protected components.

SUMMARY OF THE INVENTION

The invention comprises a material transfer vehicle having a receiving conveyor, a housing structure having an opening therein adjacent to a protected component, and a combination door and platform that is mounted in the housing structure. The combination door and platform is attached to the housing structure and is adapted to be moved between a closed configuration that covers the opening and an open configuration that provides a platform on which an operator can stand to access the chain tension adjustment assembly that is located at the elevated output end of the receiving conveyor. Preferably, the combination door and platform is pivotally mounted about a generally horizontal hinge axis at its bottom and is supported in the open position by a drop lid support assembly selected from the group consisting of hinged drop lid supports, slide drop lid supports, cables, chains or other elongate flexible devices. It is also preferred that the opening in the housing structure partially define a recess for access to protected components of the material transfer vehicle and that the recess be further defined by a pair of parallel side panels in the housing structure. It is also preferred that the recess in the housing structure of the material transfer vehicle provide for storage of the wrench or other tool that is used to adjust the chain tension. A preferred embodiment of the invention that is adapted for use on a material transfer vehicle having a surge hopper provides access to the hydraulic fluid lines that are located adjacent to the surge hopper. This embodiment of the invention also includes an access component to provide access to the combination door and platform when in the open configuration for an operator on standing on the surface on which the material transfer vehicle is placed. Preferably, the access component comprises a removable ladder that hangs on the side of the surge hopper or steps cut into the sidewall of the surge hopper.

In order to facilitate an understanding of the invention, the preferred embodiment of the invention, as well as the best mode known by the inventor for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventor includes all equivalents of the subject matter described herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENT OF THE INVENTION

Figure 1:
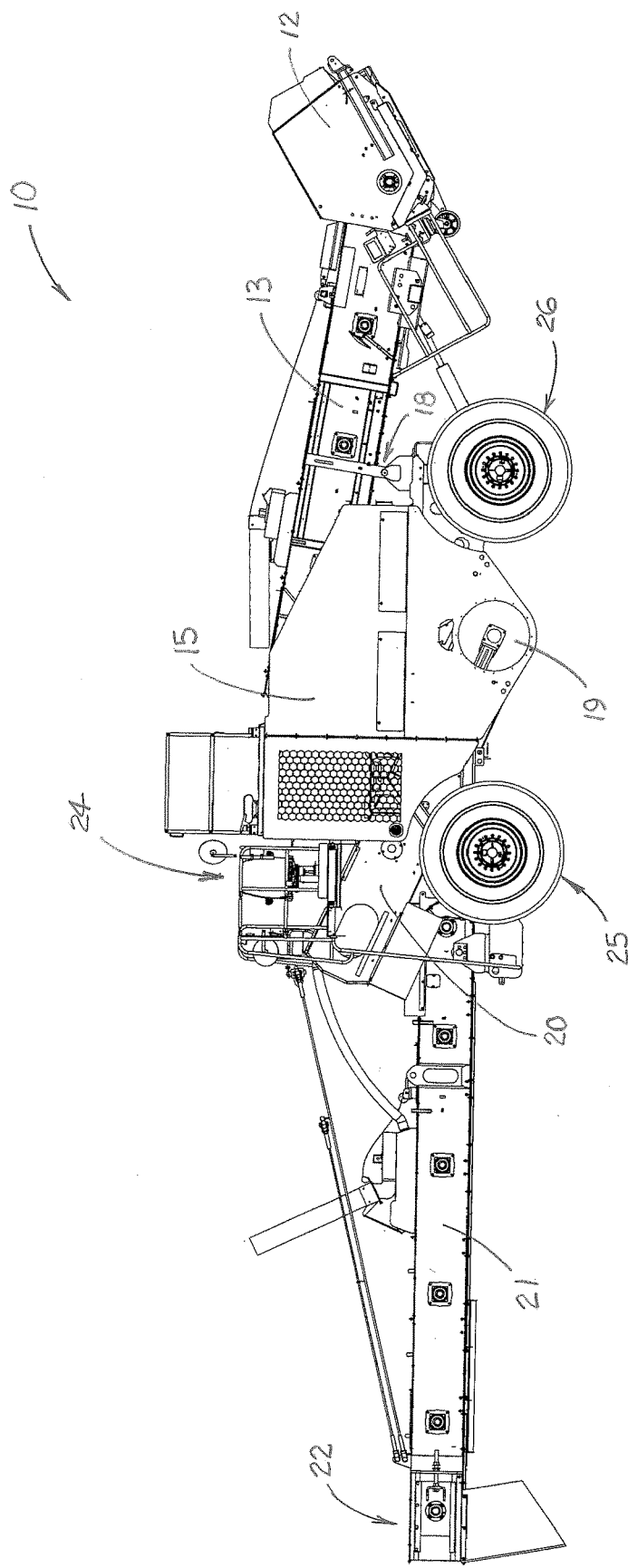
FIG. 1 is a side view of a conventional material transfer vehicle to which the invention may be applied, as configured with the receiving conveyor in the transport configuration.

This description of a preferred embodiment of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 2:
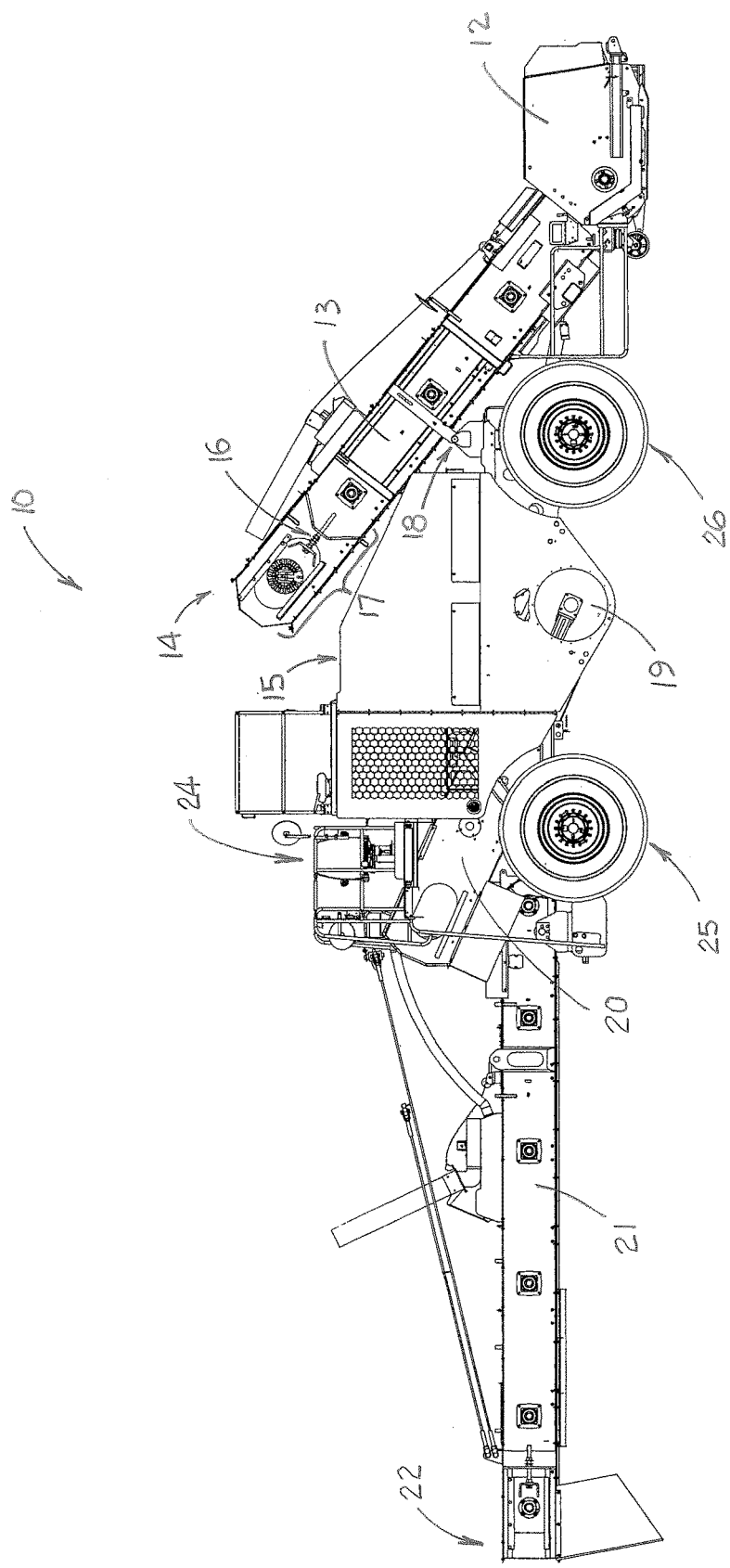
FIG. 2 is a side view of the material transfer vehicle illustrated in FIG. 1, as configured with the receiving conveyor in the working configuration.
Figure 3:
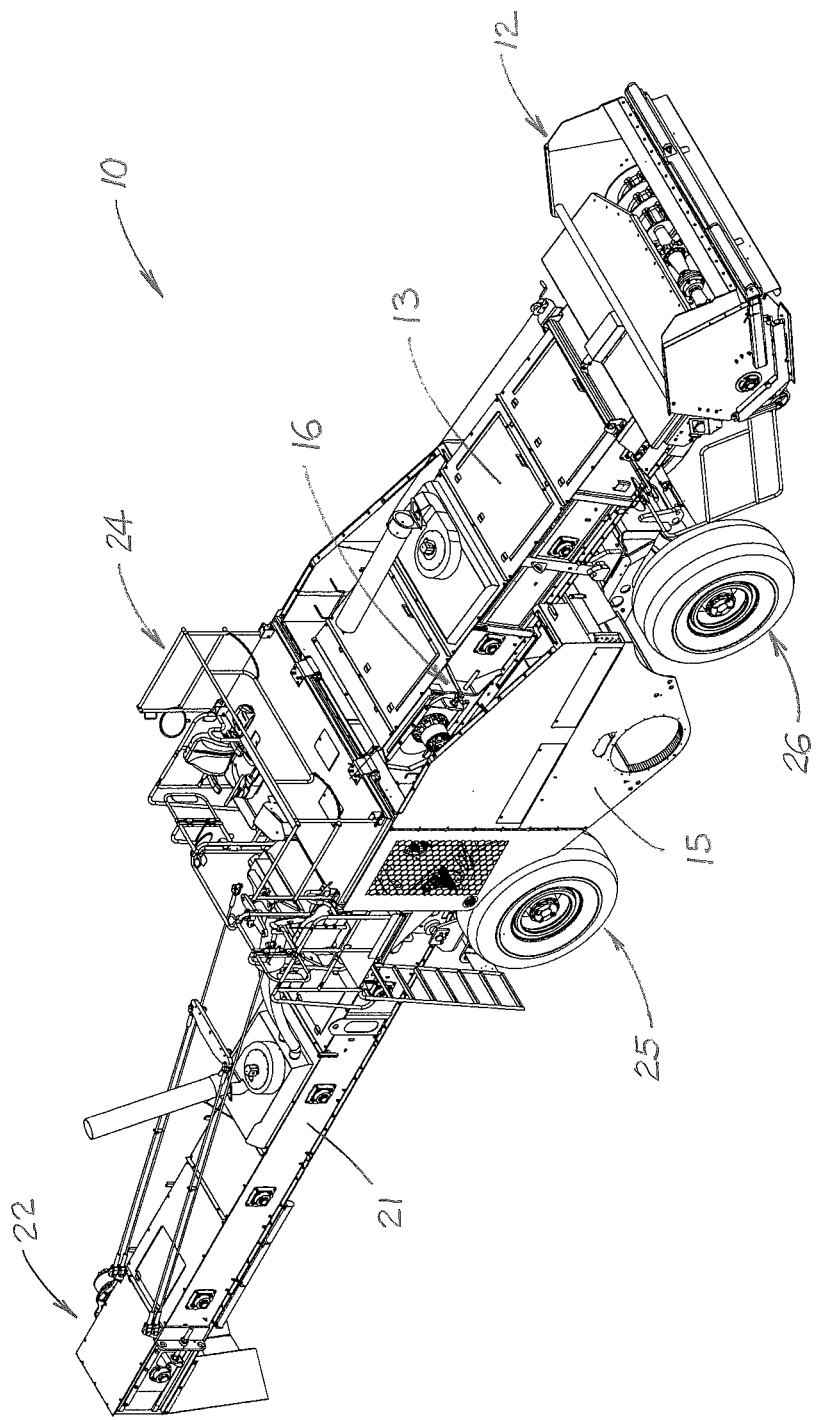
FIG. 3 is a perspective view of the material transfer vehicle shown in FIG. 1.
Figure 4:
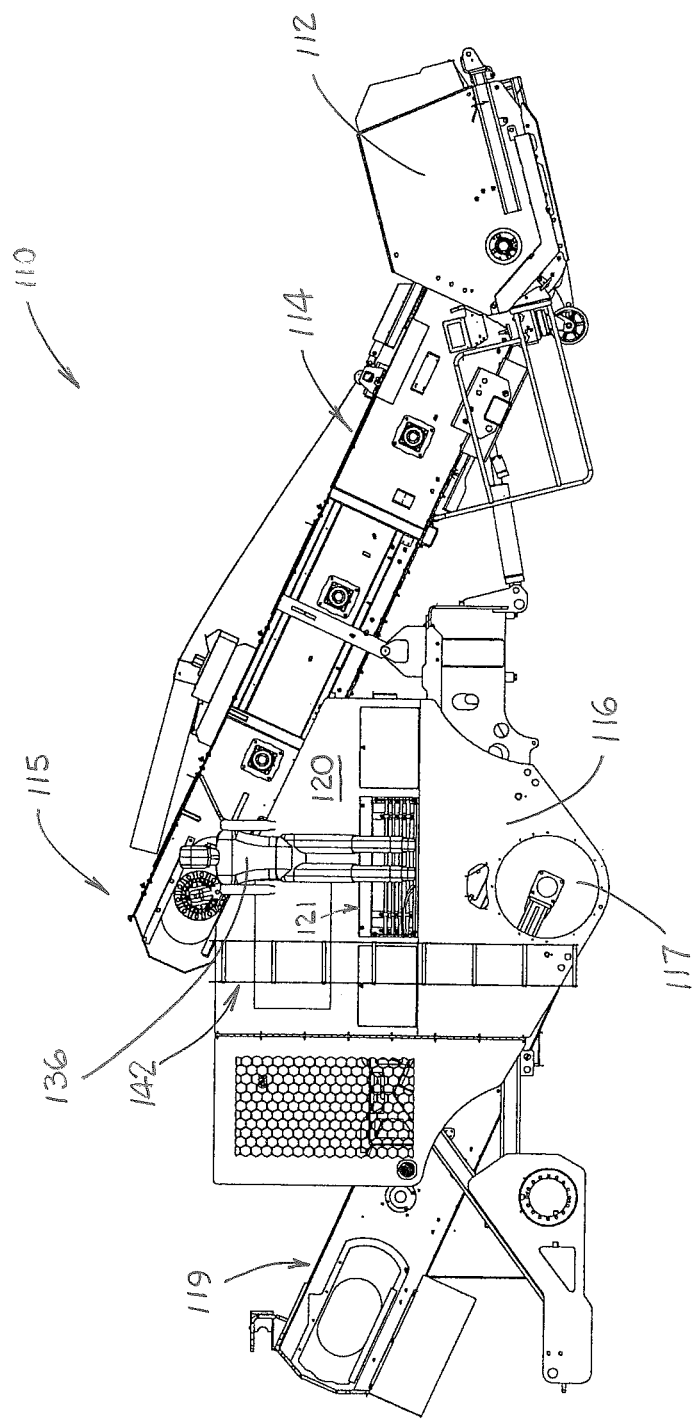
FIG. 4 is a side view of a portion of a material transfer vehicle that is equipped with a preferred embodiment of the invention, showing the receiving conveyor in an access position that allows an operator to access the chain tension adjustment assembly.

A conventional material transfer vehicle that is adapted to supply asphalt paving material to a paving machine and which may be modified according to the invention is shown in FIGS. 1-3. As shown therein, conventional material transfer vehicle 10 includes a material-receiving device comprising truck-receiving hopper 12, which is adapted to receive asphalt paving material from a supply truck (not shown). Other material transfer vehicles (not shown) may include another type of material-receiving device such as a windrow pick-up head (not shown) instead of the truck-receiving hopper. Material transfer vehicle 10 also includes receiving conveyor 13, which is operated by a conventional chain drive assembly and is adapted to convey asphalt paving material from truck-receiving hopper 12 upwardly and off its elevated output end 14 so that it falls into surge hopper 15 when receiving conveyor 13 is in the working configuration shown in FIG. 2. In the embodiment of the invention shown in the drawings, receiving conveyor 13 is a chain-driven drag conveyor that starts and stops frequently during operation. Receiving conveyor 13 carries a load that may be quite heavy at times, and consequently, it is necessary to adjust the tension of the drive chain on both sides of the conveyor from time to time. The chain tension is adjusted by manually using a wrench to adjust the bolt 16 of conventional chain tension adjustment assembly 17 and the bolt of another chain tension assembly that is identical to assembly 17 and is located on the opposite side (from that shown in FIGS. 1 and 2) at the elevated output end 14 of receiving conveyor 13. Receiving conveyor 13 is pivotable about a substantially horizontal axis through pivot 18 (perpendicular to the plane of the paper on which FIGS. 1 and 2 are shown), so that it can be moved between the transport configuration shown in FIGS. 1 and 3, and multiple intermediate configurations including the working configuration shown in FIG. 2.

The surge hopper includes remixing auger 19 and a surge hopper unloading conveyor 20 that is adapted to convey asphalt paving material out of the surge hopper and onto discharge conveyor 21. Discharge conveyor 21 is adapted to convey asphalt material to its forward end 22 where it can be dropped into the hopper of a paving machine (not shown). The discharge conveyor is also pivotable about a substantially horizontal axis (perpendicular to the plane of the paper on which FIGS. 1 and 2 are shown), so that it can be moved between the transport configuration shown in FIGS. 1-3, and multiple working configurations including one (not shown) that elevates forward end 22 to allow discharge of asphalt paving material into the hopper of a paving machine. The discharge conveyor is also pivotable about a substantially vertical axis so that forward end 22 can be moved to place it over the receiving hopper of a paving machine that is located on either side of the material transfer vehicle. Material transfer vehicle 10 also includes operator's platform 24 from which the machine can be controlled by an operator. Material transfer vehicle 10 is propelled along the roadway by a drive system that includes and/or is operatively connected to first wheel set 25 and second wheel set 26. Each of the wheel sets is driven by one or more hydraulic motors (not shown) that are supplied with fluid under pressure by one or more hydraulic pumps (also not shown). Power for operating the various systems and components of material transfer vehicle 10 is supplied by an internal combustion engine (not shown).

Figure 5:
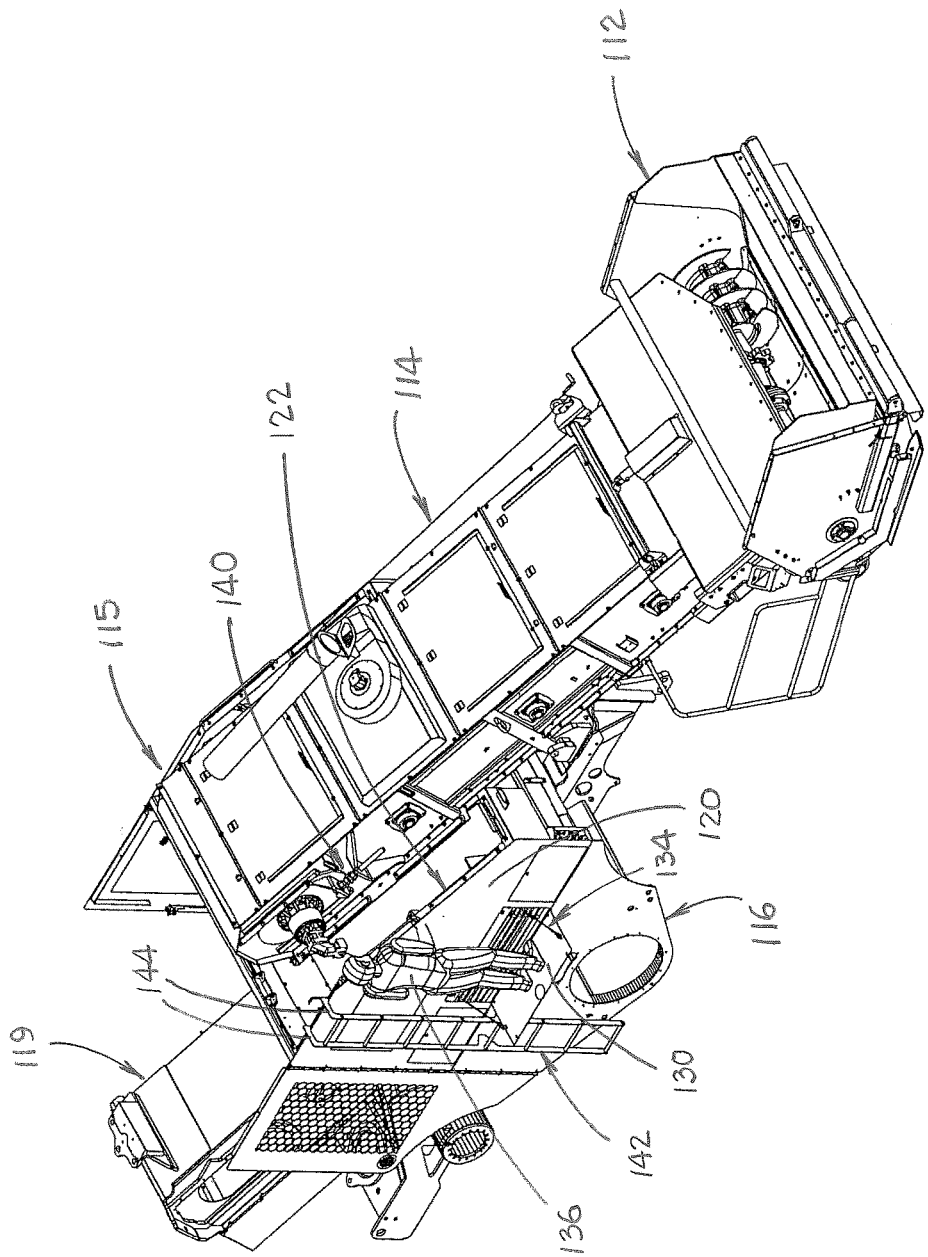
FIG. 5 is a side perspective view of the portion of the material transfer vehicle shown in FIG. 4.
Figure 6:
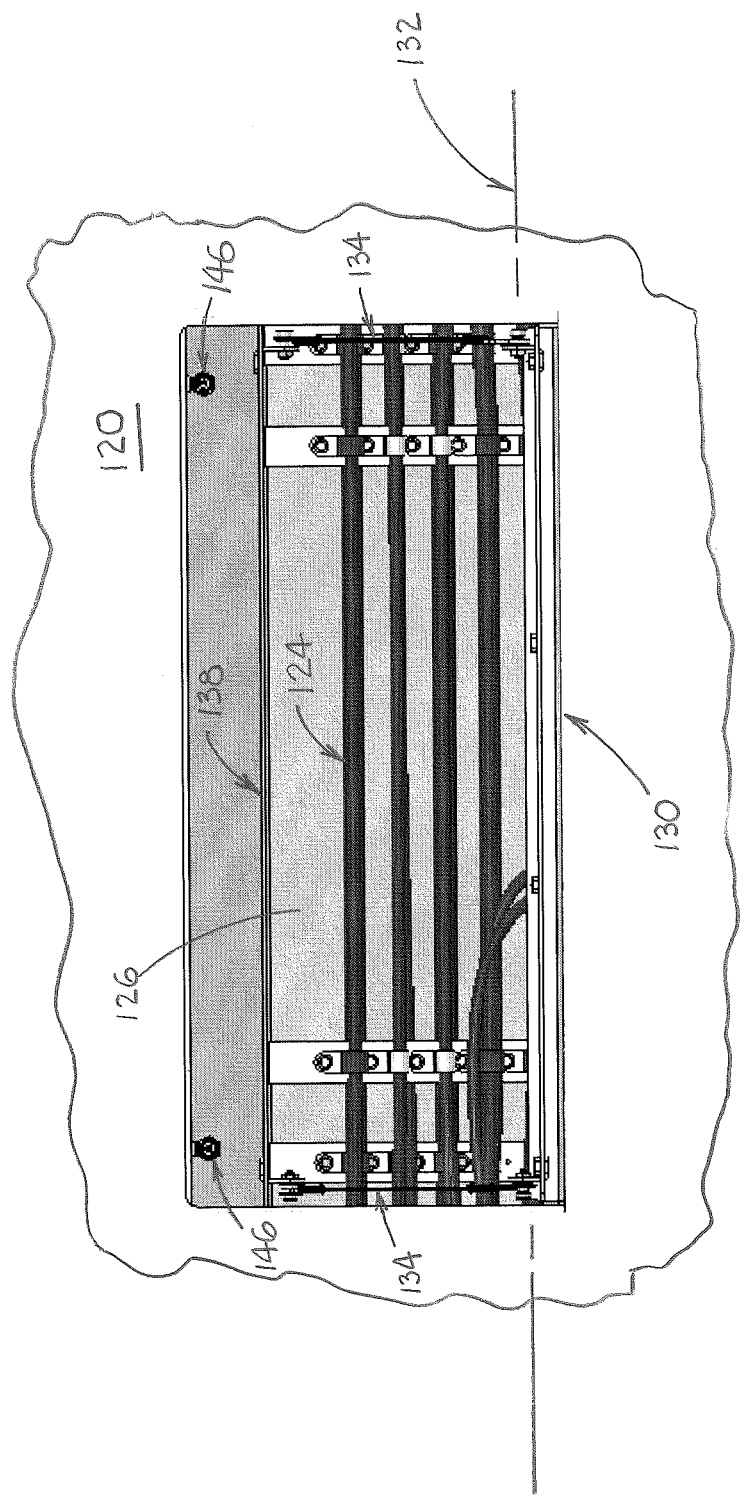
FIG. 6 is a close-up view of the combination door and platform of a preferred embodiment of the invention, showing an opening in the housing structure of the material transfer vehicle that includes a recess for storage of the tool that is used to adjust the chain tension, and showing how the invention provides access to the hydraulic fluid lines that are located adjacent to the surge hopper.

FIGS. 4-7 illustrate how a conventional material transfer vehicle such as material transfer vehicle 10 can be modified according to the invention. As shown therein, modified material transfer vehicle 110 includes receiving conveyor 114, which is adapted to convey asphalt paving material from truck-receiving hopper 112 upwardly and off its elevated output end 115 so that if falls into surge hopper 116 when vehicle 110 is in a working configuration (not shown, but similar to the configuration of material transfer vehicle 10 shown in FIG. 2). The surge hopper includes remixing auger 117 and surge hopper unloading conveyor 119 that is adapted to convey asphalt paving material out of the surge hopper and onto a discharge conveyor (not shown, but substantially similar to discharge conveyor 21 of material transfer vehicle 10). Surge hopper 116 of material transfer vehicle 110 is defined in part by a housing structure that is adjacent to and encloses protected components. Thus, as shown in FIGS. 5 and 6, the housing structure of this embodiment of the invention includes a pair of sidewalls, each of which is comprised of two panels, such as left outer sidewall panel 120 and left inner sidewall panel 122. Left outer sidewall panel 120 has an opening 121 therein. Preferably, left outer sidewall panel 120 is substantially parallel to left inner sidewall panel 122, and protected components for the material transfer vehicle, such as a plurality of hydraulic fluid lines (including hydraulic fluid lines 124 which are best shown in FIG. 6) are contained within recess 126 that is defined in part by opening 121 in left outer sidewall panel 120 and is further defined by the parallel panels. In other embodiments of the invention (not shown), the housing structure may define components of the material transfer vehicle other than the surge hopper, such as a fuel tank or a hydraulic fluid tank, for example.

As shown in FIG. 6, hydraulic fluid lines 124 are located adjacent the surge hopper in recess 126 between left outer sidewall panel 120 and left inner sidewall panel 122. A similar arrangement of hydraulic fluid lines (not shown) are contained in a recess (not shown) between a right outer sidewall panel (not shown, but a mirror image of left outer sidewall panel 120) and a right inner sidewall panel (also not shown, but a mirror image of left inner sidewall panel 122) on the opposite side of surge hopper 116. Access to recess 126 and the hydraulic fluid lines therein may be obtained by opening combination door and platform 130, which is hingedly mounted at its bottom so as to pivot about substantially horizontal pivot axis 132. When in the open position shown in FIGS. 4-6, combination door and platform 130 is supported by a pair of elongate flexible support devices such as support cables 134, although other elongate flexible support devices such as chains or ropes, or other drop lid support assemblies such as hinged drop lid supports and slide drop lid supports, may alternatively be employed. Cables 134 and the structure of combination door and platform 130 are substantial enough to support an operator such as operator 136 when door and platform 130 is in the open position shown in FIGS. 4-6. Horizontal shelf 138 is located within recess 126 and is adapted to contain a tool such as the wrench (not shown) that operator 136 standing on combination door and platform 130 may use to adjust chain tension adjustment assembly 140 (which is essentially identical to chain tension adjustment assembly 17 of material transfer vehicle 10) when receiving conveyor 114 is in the access position shown in FIGS. 4 and 5. A combination door and platform essentially identical to door and platform 130 is located on the right side of vehicle 110 adjacent a chain tension adjustment assembly that is essentially identical to assembly 140 on the right side of elevated output end 115 of receiving conveyor 114.

In the embodiment of the invention shown in the drawings, combination door and platform 130 may be accessed by removable ladder 142 having a pair of hangers 144 at the upper end to allow the ladder to hang on the side of surge hopper 116. Alternatively, steps (not shown) may be cut into the structure of the hopper sidewall. When combination door and platform 130 is not in use, the door and platform may be pivoted upwardly on its hinge about pivot axis 132 and secured in a closed position by conventional closure elements 146 located at the top of the combination door and platform. In addition, support cables 134 may be detachable to allow the door/platform to swing down when not being used as a platform to support an operator, so that the operator can stand on the ground or on ladder 142 and have easy access to hydraulic fluid lines 124 or other protected components within recess 126.

Although this description contains many specifics, these should not be construed as limiting the scope of the invention but as merely providing illustrations of the presently preferred embodiment thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A material transfer vehicle comprising:
   (a) a material receiving device that is adapted to receive asphalt paving material;
   (b) a receiving conveyor that is operatively attached to the material receiving device, said receiving conveyor:
      (i) comprising a chain drive assembly that includes a chain tension adjustment assembly;
      (ii) being pivotable about a substantially horizontal axis so that it can be moved between a transport configuration in which the material receiving device is raised, an intermediate adjustment configuration, and a working configuration in which the material receiving device is lowered;
   (c) a housing structure that encloses protected components and includes an opening adjacent to the protected components;
   (d) a combination door and platform that is attached to the housing structure and is adapted to be moved between a closed configuration that covers the opening and an open configuration that provides:
      (i) access to the protected components;
      (ii) a platform on which an operator can stand to access the chain tension adjustment assembly.

2. The material transfer vehicle of claim 1 wherein the opening in the housing structure partially defines a recess for access to the protected components, which recess is further defined by a pair of parallel side panels in the housing structure.

3. The material transfer vehicle of claim 2 wherein the recess includes a shelf that is adapted to contain a tool that an operator standing on combination door and platform may use to adjust the chain tension adjustment assembly when the receiving conveyor is in the intermediate adjustment configuration.

4. The material transfer vehicle of claim 1 wherein the combination door and platform is pivotally mounted on a hinge at its bottom, which hinge has a generally horizontal hinge axis.

5. The material transfer vehicle of claim 4 which includes closure elements located at the top of the combination door and platform so that it may be pivoted upwardly on its hinge and secured in a closed position.

6. The material transfer vehicle of claim 4 wherein the combination door and platform is supported in the open position by a drop lid support assembly.

7. The material transfer vehicle of claim 6 wherein the drop lid support assembly comprises a pair of elongate flexible support devices which may be detached when the combination door and platform is in the open configuration to allow the combination door and platform to swing down when not being used as a platform to support an operator, so that the operator can obtain access to the opening in the housing structure while standing on the surface on which the material transfer vehicle is placed.

8. The material transfer vehicle of claim 6, wherein the drop lid support assembly is selected from the group consisting of hinged drop lid supports and slide drop lid supports.

9. The material transfer vehicle of claim 1 which includes an access component to provide access to the combination door and platform when in the open configuration for an operator standing on the surface on which the material transfer vehicle is placed.

10. The material transfer vehicle of claim 9 wherein the access component comprises a removable ladder that hangs on the side of the housing structure.

* * * * *